US008626609B1

(12) United States Patent
Vippagunta

(10) Patent No.: US 8,626,609 B1
(45) Date of Patent: * Jan. 7, 2014

(54) ORDER CONSOLIDATION PREDICTION

(71) Applicant: Amazon Technologies, Inc., Reno, NV (US)

(72) Inventor: Rajendra Kumar Vippagunta, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,099

(22) Filed: Jan. 28, 2013

Related U.S. Application Data

(63) Continuation of application No. 12/566,219, filed on Sep. 24, 2009, now Pat. No. 8,364,551.

(51) Int. Cl.
    *G06Q 30/00* (2012.01)
(52) U.S. Cl.
    USPC ..................... 705/26.8; 705/26.1; 705/27.1
(58) Field of Classification Search
    USPC ............................................. 705/26.1–27.2
    See application file for complete search history.

(56) References Cited

U.S. PATENT DOCUMENTS

| 5,960,411 A * | 9/1999 | Hartman et al. ............ 705/26.81 |
| 2002/0032613 A1 * | 3/2002 | Buettgenbach et al. ........ 705/26 |
| 2008/0052226 A1 * | 2/2008 | Agarwal et al. ................. 705/39 |

OTHER PUBLICATIONS

Vigoroso, M. (1999). Lots of interest, little action. Purchasing, 126(4), 43-48.*
U.S. Appl. No. 12/566,219, filed Sep. 24, 2009, Rajendra Kumar Vippagunta, "Order Consolidation Prediction".
"Flowers Online to Offer Floral Gift Services Through Ariba Network E-Commerce Service", PR newswire, NY, Sep. 27, 1999, pp. 1-6.
Non-Final Office Action U.S. Appl. No. 12/566,219, mailed on Mar. 28, 2012, Rajendra Kumar Vippagunta, "Order Consolidation Prediction", 18 pages.

* cited by examiner

*Primary Examiner* — Resha Desai
(74) *Attorney, Agent, or Firm* — Lee & Hayes, PLLC

(57) ABSTRACT

Described herein are predictions of consolidation between previously placed orders and potential orders in, for example, an e-commerce system. A consolidation prediction may include a determination of a cost differential between consolidating the potential order(s) with previously placed order(s) and refraining from consolidating the potential order(s). The cost differential may comprise a savings in shipping costs, taxes, handling fees, and so forth. In addition, this cost differential may be presented to the user. When the user desires to complete the potential orders, the previously placed order(s) and potential order(s) may be consolidated to a single order, merchant, payment type, destination, and so forth.

27 Claims, 11 Drawing Sheets

ORDER CONSOLIDATION PREDICTION

PRIORITY APPLICATION

This application is a continuation of and claims priority to pending U.S. patent application Ser. No. 12/566,219, which was filed Sep. 24, 2009, entitled "Order Consolidation Prediction," which is incorporated by reference herein in its entirety.

BACKGROUND

Companies utilizing e-commerce sites strive to enrich the experience of users who access these sites to consume goods or services that these sites offer. To do so, these sites often message to users information about the users may save money on the site. To provide a few examples, these sites may inform the users about sale items, special promotions and any other ways that the users of the site may save money on goods or services that the sites offer. While the currently employed techniques have proven successful in enriching user experiences, these sites continue to strive to make more advances in this regard.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to, in part, predicting consolidation of an existing open order with other selected items. In some instances, an "open" order comprises an order for one or items (e.g., goods, services, etc.) that has not yet been completed. For instance, a user may have placed an order with a transaction processing service for an item such as an Acme toaster. Later, the user may select a pair of shoes to form a potential order. Before converting the potential order to a completed order, however, the transaction processing service may predict both a total cost to the user if the selected pair of shoes is consolidated with the previously placed order as well as a total cost to the user if the selected pair of shoes is placed as a separate order. The service may then calculate and present to the user a cost differential between consolidation with the previously placed order and non-consolidation. Thus, before completion of the potential order the user sees the cost differential indicating that consolidating the Acme toaster order with the potential order for the shoes would result in a savings on shipping and handling costs. The user may thus make an informed decision as to what and whether to consolidate.

The discussion begins with a section entitled "Illustrative Architecture," which describes one non-limiting architecture in which the claimed techniques may be implemented. A section entitled "Illustrative User Interfaces and Flow Diagram" follows. This section depicts and describes illustrative examples of user interfaces (UIs) that may be served to and rendered at the devices of the users of FIG. 1. This section also illustrates and describes an example flow diagram for the overall process. A section entitled "Illustrative Consolidation Types" then depicts and describes illustrative examples of predicted consolidation generated by the transaction processing service of FIG. 1. A fourth section entitled "Illustrative Processes" follows, and describes example flow diagrams of one implementation of the predictive order consolidation process. Finally, a brief conclusion ends the discussion. This brief introduction, including section titles and corresponding summaries, is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. However, it is to be appreciated that this following implementation and context is but one of many.

Figure 1:
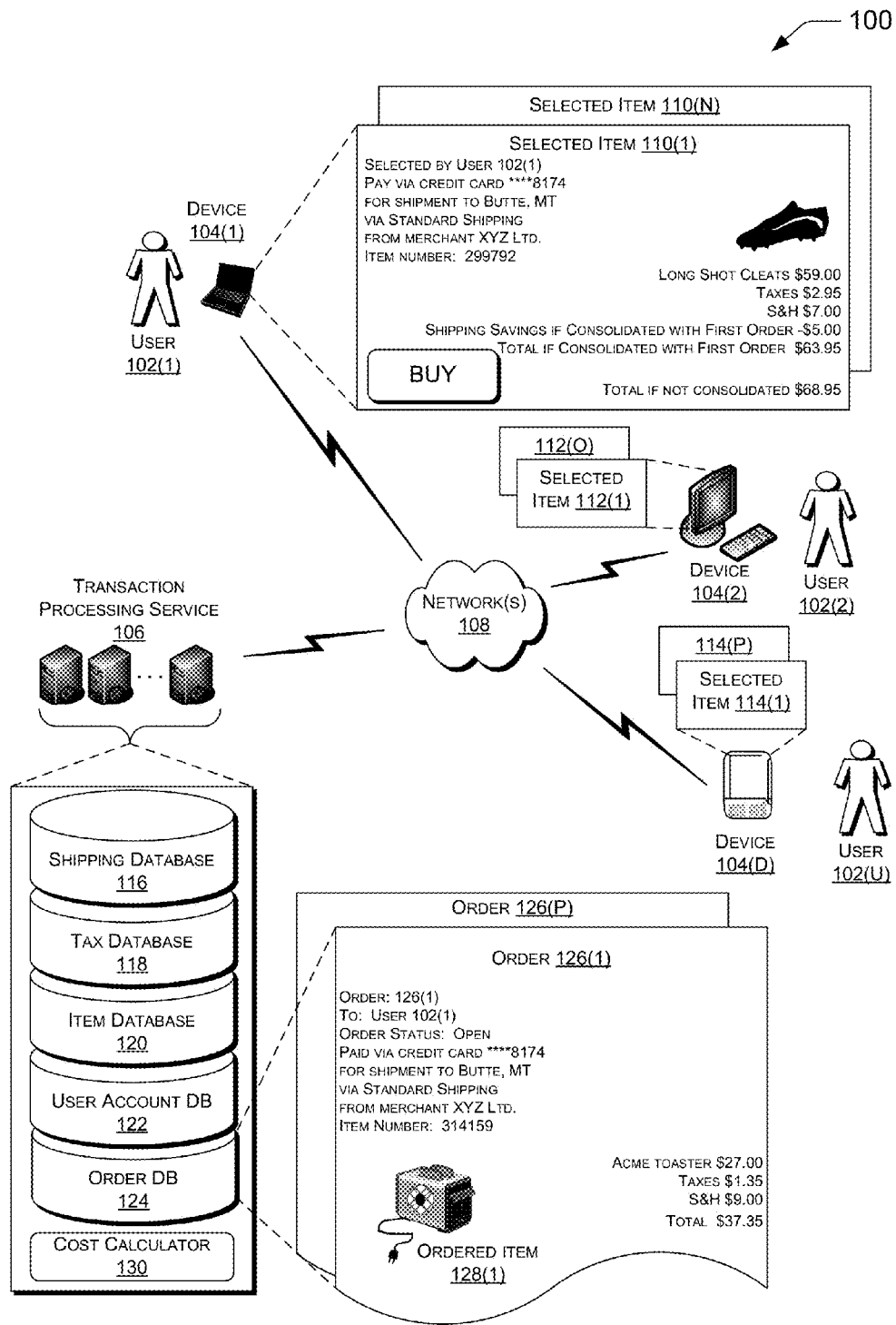
FIG. 1 illustrates an example architecture in which order consolidation prediction techniques may be implemented. This example architecture illustrates multiple users each accessing a transaction processing service that may accept item orders and may propose consolidation between existing orders and subsequently selected items.

Illustrative Architecture FIG. 1 illustrates an example architecture 100 in which the claimed techniques may be implemented. Here, the techniques are described in the context of users 102(1), 102(2), . . . , 102(U) operating computing devices 104(1), 104(2), . . . , 104(D) to access transaction processing service 106 via a network 108. As used in this application, letters within parentheses, such as "(U)" or "(D)"

", denote any integer number greater than zero. Network 108 may include any one or combination of multiple different types of networks, such as cable networks, the Internet, and wireless networks. User computing device 104, meanwhile, may be implemented as any number of computing devices, including as a personal computer, a laptop computer, a portable digital assistant (PDA), a mobile phone, a set-top box, a game console, a personal media player (PMP), and so forth. User computing device 104 is equipped with one or more processors 112 and memory 114 to store applications and data. An application, such as a browser or other client application, running on device 104 may facilitate access to transaction processing service 106 over network 108.

Each user 102(1)-(U) may operate a corresponding computing device 104(1)-(D) to select and/or order items from transaction processing service 106. For example, user 102(1) may select items 110(1), 110(2), . . . , 110(N), while user 102(2) may select items 112(1), 112(2), . . . , 112(O), and user 102(U) may select items 114(1), 114(2), . . . , 114(P). Furthermore, each user 102 may use multiple computing devices 104, for example desktop computers, netbooks, smartphones, etc., to order and/or select items through the transaction processing service 106

In architecture 100, transaction processing service 106 may comprise any sort of provider that supports user interaction, such as social networking sites, e-commerce sites, informational sites, news and entertainment sites, and so forth. In one implementation, this site may be encoded using a tag-based language, such as hypertext markup language (HTML). Furthermore, while the illustrated example represents user 102 accessing transaction processing service 106 over network 108, the described techniques may equally apply in instances where user 102 interacts with the content provider over the phone, via a kiosk, or in any other manner. It is also noted that the described techniques may apply in other client/server arrangements, as well as in non-client/server arrangements.

As illustrated, transaction processing service 106 may be hosted on one or more servers having one or more processors and memory. In one implementation, the servers might be arranged in a cluster or as a server farm, although other server architectures may also be used. The transaction processing service 106 is capable of handling requests from many users and serving, in response, various content that can be rendered at user computing devices, such as user computing device 104 for consumption by user 102.

In some implementations, a plurality of transaction processing services 106 may be coordinated to provide consolidation across a plurality of merchants and/or transaction processing services 106. For example, a user 102 may purchase an item from merchant "A" via a first transaction processing service, and then enter a potential order with merchant "B" via a second transaction processing service. These two transaction processing services may be in communication and may exchange information with one another, thus allowing for consolidation of the potential order of merchant "B" with the order placed with merchant "A." In still other implementations, multiple merchants may use a same transaction processing service 106. Regardless of whether these merchants operate through a single or multiple transaction processing services, however, these implementations may allow for consolidation across a plurality of merchants.

Transaction processing service 106 may store or have access to a shipping database 116, a tax database 118, an item database 120, a user account database 122, an order database 124 and a cost calculator 130. Shipping database 116 stores or otherwise has access to one or more shipping rate profiles. Each profile is associated with a respective shipment method for a type of item to a given location. These profiles may include, without limitation, postal services, common carriers, couriers, private carriers, and/or any other service or entity that may be used to deliver an item. For example, the shipping rate profile may specify that a two-pound, non-hazardous, fragile item shipped via a common carrier (such as FedEx® Corporation of Memphis, Tenn.) from Sparks, Nev. to San Jose, Calif. via regular ground will cost $3.95 to user 102(1). Another profile may indicate regulatory restrictions on shipping.

Tax database 118 stores or otherwise has access to one or more tax rate profiles. Each profile is associated with a particular location and may also vary based on type of item. These profiles may include, without limitation, sales tax rates, use tax rates, sumptuary tax rates, duties, custom fees, and/or other charges levied by a regulatory body upon transit of an item through, or delivery to, that body's jurisdiction. For example, the tax rate profile may indicate San Jose, Calif. levies a 12% sales tax on items, excluding shipping and handling fees.

Item database 120 stores or otherwise has access to information relating to one or more items available through the transaction processing service 106, and may include the actual items themselves in the case of digital content objects. An item includes anything that transaction processing service 106 offers for purchase, rental, subscription, viewing, informative purposes or some other form of consumption. Items may be products, services, digital downloads, news clips, customer-created content (e.g., customer reviews), information, or some other type of sellable or non-sellable unit. In some embodiments, the item may be offered for consumption by transaction processing service 106, while in other embodiments, site 106 may host items that others are offering using the site.

Item database 120 is accessible, directly or indirectly, by one or more of servers. Each item, meanwhile, represents an associated physical or digital item and, as such, item database 120 may store information about each associated item. For items such as books or music CDs, for example, item database 120 may contain a description, images of the product, author/artist names, publication data, pricing, shipping information, and so forth. For other types of items, item database 120 may contain different information appropriate for those items.

Information contained within the item database 120 about an item may include the description, price, availability, location (physical or digital), weight, physical dimensions, type of item, and so forth. This information may be used to determine delivery options. For example, the item "Acme toaster" may be designated to have a price of $27.00 within the United States, and may be designated as a fragile item weighing six pounds and have a shipping volume of 0.5 cubic feet.

User account database 122, meanwhile, stores or otherwise has access to information relating to particular users and, potentially, associated user accounts. This information may include access rights, payment options, default shipment locations, transaction phrase tokens, and so forth. For example, user 102(N) may have an account associated with a default shipping location of Boulder, Colo. Also, a transaction phrase token may be associated with specific rules governing what type of items may be purchased, how much may be spent, where an item may be delivered, and so forth. Transaction phrase tokens are discussed in U.S. Provisional Application No. 60/823,611, filed on Aug. 25, 2006, and pending U.S. patent application Ser. No. 11/548,111, filed on Oct. 10, 2006 both entitled "Utilizing Phrase Tokens In Transactions," both of which are incorporated herein by reference in their entirety.

Order database 124 stores or otherwise has access to information relating to orders placed by users. This information may include order number, order status (such as "open" where items may be added and "closed" where items may no longer be added), customer identifier, payment method, shipment method, merchant identifier, item identifier, costs and so forth. For example, in the illustrated example order database 124 has stored order 126(1) placed by user 102(1) for ordered item 128(1), an "Acme toaster." Order 126(1) is shown with an order status of "open," indicating that the order has yet to be entirely completed. As such, additional items may be added to the order in some instances or the order may be other otherwise modified.

Also as illustrated, order 126(1) may include order details. For example, the depicted order details show that this item has an item number of 314159, Acme toaster that user 102(1) ordered the item, that user 102(1) paid for the item with a credit card ending 8174 and that service 106 will ship the item to Butte, Mont. via standard shipping from merchant XYZ Ltd. In addition, the order details illustrate that the order has an item price of $27.00, taxes of $1.35 and shipping and handling costs of $9.00 for an order total of $37.35. Other orders 126(2), 126(3), ..., 126(P) may also be stored within order database 124.

Databases 116-124 of transaction processing service 106 may be accessible to cost calculator 130. Cost calculator 130 may be configured to assess orders 126(1)-(P) and selected item information, such as items 110(1)-(N), 112(1)-(O), 114(1)-(P), to predict consolidation and calculate cost differentials between consolidation and non-consolidation.

For example, order 126(1) for the "Acme toaster" remains in "open" status and may have items added to it. User 102(1) has selected an item 110(1) from the same vendor, using the same payment method, and having the same shipment method and destination. Cost calculator 130 may then predict consolidating selected item 110(1) with order 126(1), based on these commonalities. Cost calculator 130 may also present a cost differential associated with the predicted consolidation. This consolidation prediction and predicted cost may thus be used to show user 102(1) that a savings of $5.00 would result from consolidating the selected item (the "Long Shot Cleats") with the existing order (for the "Acme toaster").

Illustrative User Interfaces and Flow Diagram

Figure 2:
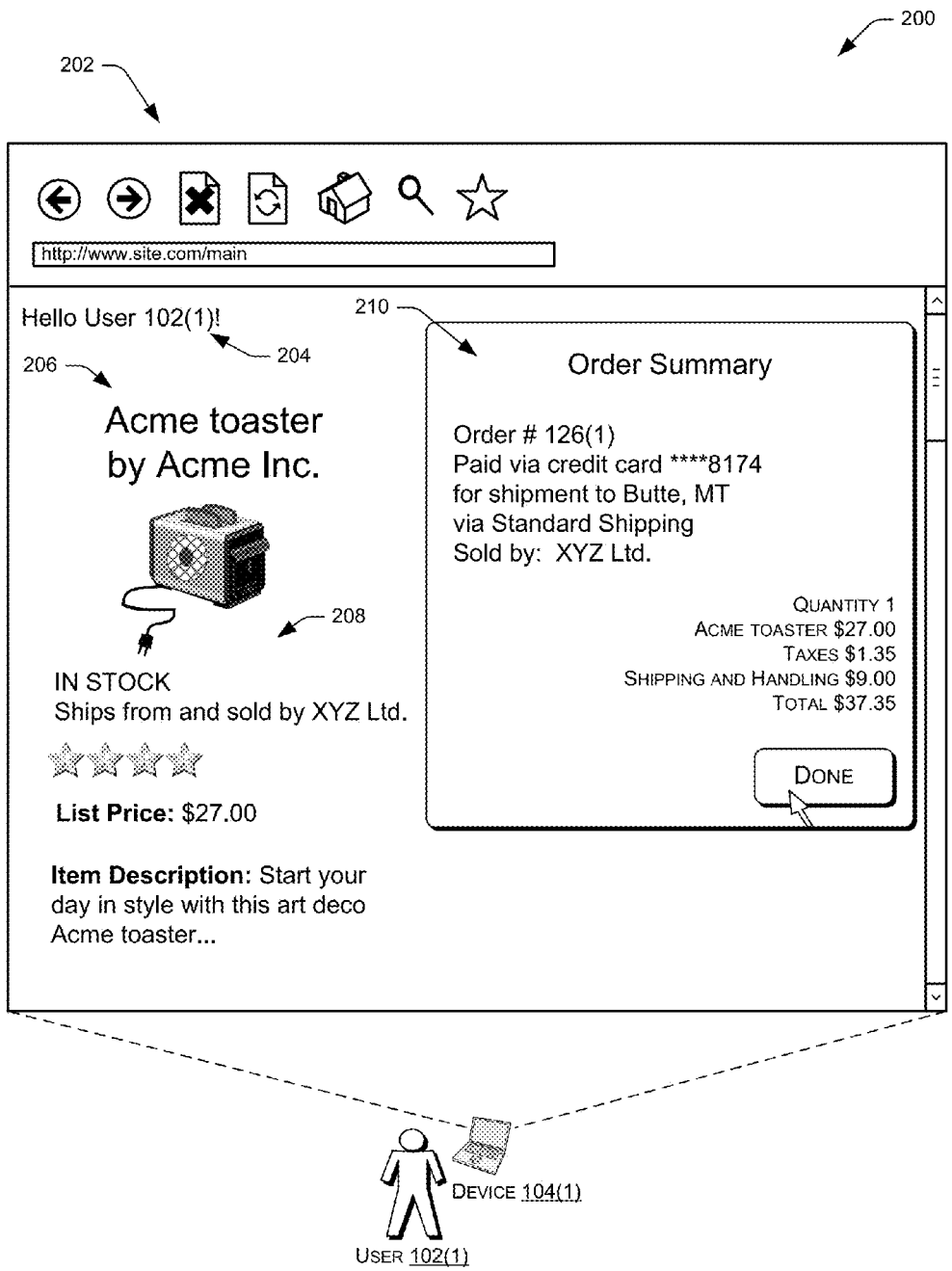
FIG. 2 illustrates an example screen rendering of a user interface served to a user device by the transaction processing service of FIG. 1. Here, the example user interface shows an order summary after completion of an order for an initial item.

FIG. 2 illustrates an example screen rendering of a user interface (UI) 200 served by the transaction processing service 106 of FIG. 1 to device 104(1) after user 102(1) has completed an order for the "Acme toaster." Here, browser 202 displays the user interface 200 provided by transaction processing service 106. User interface 200 may include an indication 204 that user 102(1) is signed-in, or otherwise been authenticated by transaction processing service 106.

User interface 200 includes an illustration of an Acme toaster appliance 206 offered by transaction processing service 106 and purchased by user 102(1). While UI 200 illustrates an Acme toaster, UI 200 could similarly illustrate one or more alternative or additional items offered for sale or offered for another form of consumption. User interface 200 further includes details 208 about Acme toaster 206. Details 208 may include a rating of the Acme toaster, a price of the Acme toaster, a description of the Acme toaster and so forth. Of course, while FIG. 2 includes example details 208 associated with UI 200, it is to be appreciated that these details are included for context only and that other implementations may employ more or less information than the illustrated implementation.

In addition, UI 200 may include an order summary 210 that includes, amongst other things, order information described above, such as item identifier, price, shipment method, payment method and so forth. For example, in this illustration the order summary 210 shows order 126(1) for a single "Acme toaster" 206. Order summary 210 also illustrates that user 102(1) is presented with information about the order, which notes that user 102(1) paid for the item via a credit card ending in 8174 and that user 102(1) chose to ship this item to Butte, Mont. via standard shipping from XYZ Ltd. Order summary 210 also illustrates the price of $27.00, taxes of 1.35, shipping and handling of $9.00 and a total cost to user 102(1) of $37.35.

Figure 3:
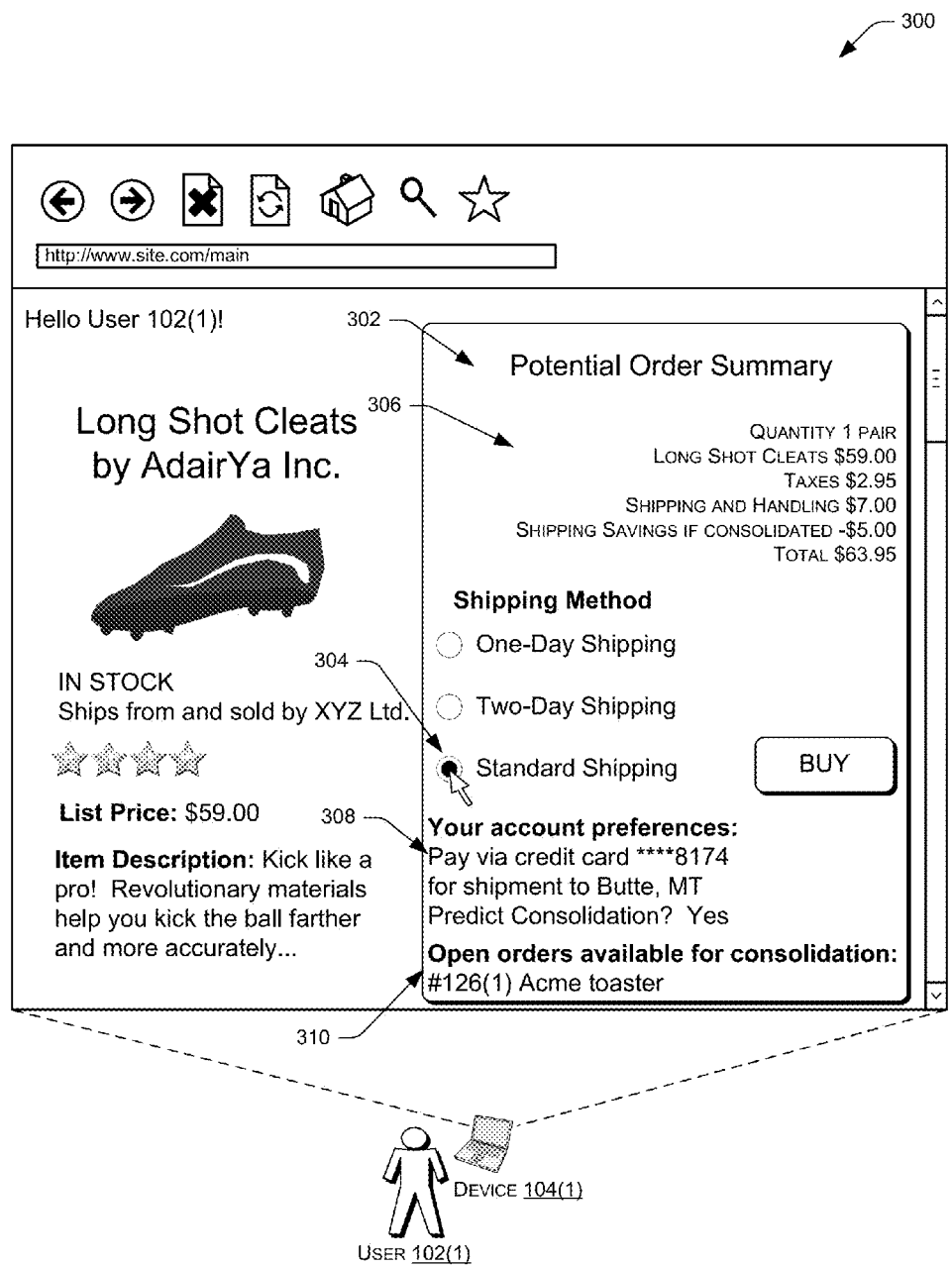
FIG. 3 illustrates another example screen rendering of a user interface served to a user device by the transaction processing service of FIG. 1. Here, the example user interface shows a user selected item and the potential savings resulting from a predicted consolidation with the order for the initial item of FIG. 1.

FIG. 3 illustrates an example screen rendering of a user interface (UI) 300 served by the transaction processing service 106 of FIG. 1 to device 104(1) after user 102(1) has placed the order of FIG. 2 and after user 102(1) has selected a pair of "Long Shot Cleats" for a potential order. At this point, the user has not placed the order. In some implementations, an order may be considered "placed" when the order would be delivered or available to the user without further action.

A potential order summary 302 may be displayed, which includes a predicted consolidation with open order 126(1). This potential order summary 302 may comprise several pieces of information, including an identification of the item the user 102(1) currently views, namely the single pair of "long shot cleats." Potential order summary 302 also illustrates that the same merchant from which user 102(1) purchased the Acme toaster also offers for consumption the illustrated cleats (namely, "XYZ Ltd."). In addition, potential order summary 302 illustrates that if user 102(1) orders cleats 110(1) using the user's credit card ending in 8174 and if user 102(1) chooses to ship these cleats to Butte, Mont. via standard shipping the user 102(1) would realize some savings by consolidating this item with the previously placed and still open order 126(1). Potential order summary 302 may also illustrate a cost to the user if user 102(1) chooses not to consolidate this item with the open order. Specifically, potential order summary 302 indicates that cleats 110(1) would have a price of $59.00, taxes of $2.95, shipping and handling of $7.00 if non-consolidated. This summary further illustrates that user 102(1) would realize a $5.00 savings if user 102(1) chooses to consolidate the purchase of this item with order 126(1), for a consolidated order total of $63.95.

A shipping method selection 304 allows selection of shipment methods such as standard shipping, two-day shipping, one-day shipping and so forth. Cost information 306, such as quantity, pricing, taxes, shipping and handling and totals (as described in FIG. 2) now includes a shipping savings if consolidated based on the predicted consolidation.

Potential order summary 302 may also include default account preferences 308 such as payment method, shipment method, whether consolidation predictions are enabled for this user and so forth. Finally, the potential order summary may show orders available for consolidation 310, such as order 126(1) shown here.

In the instant example, user 102(1) may select a shipping method selection 304 of standard shipping. As a result of this selection, transaction processing service 106 may predict that this potential order for the selected item 110(1) of cleats is eligible for consolidation with the previously completed Acme toaster order 126(1). Furthermore, cost calculator 130 may generate a cost differential based on this predicted consolidation. User interface 300 may then present this cost differential to user 102(1) at 306, which illustrates the shipping savings of $5.00 resulting from the predicted consolidation. In this example, order 126(1) is available for consolidation as it is still in "open" status. In some implementations, an "open" order is an order where one or more order details such as items, quantities, shipment method and so forth may be modified. In contrast, a closed order may be an order in which no modification is permitted. For example, an order for which all items have shipped, payment has been received and/or is in a closed financial reporting period may be considered "closed."

Figure 4:
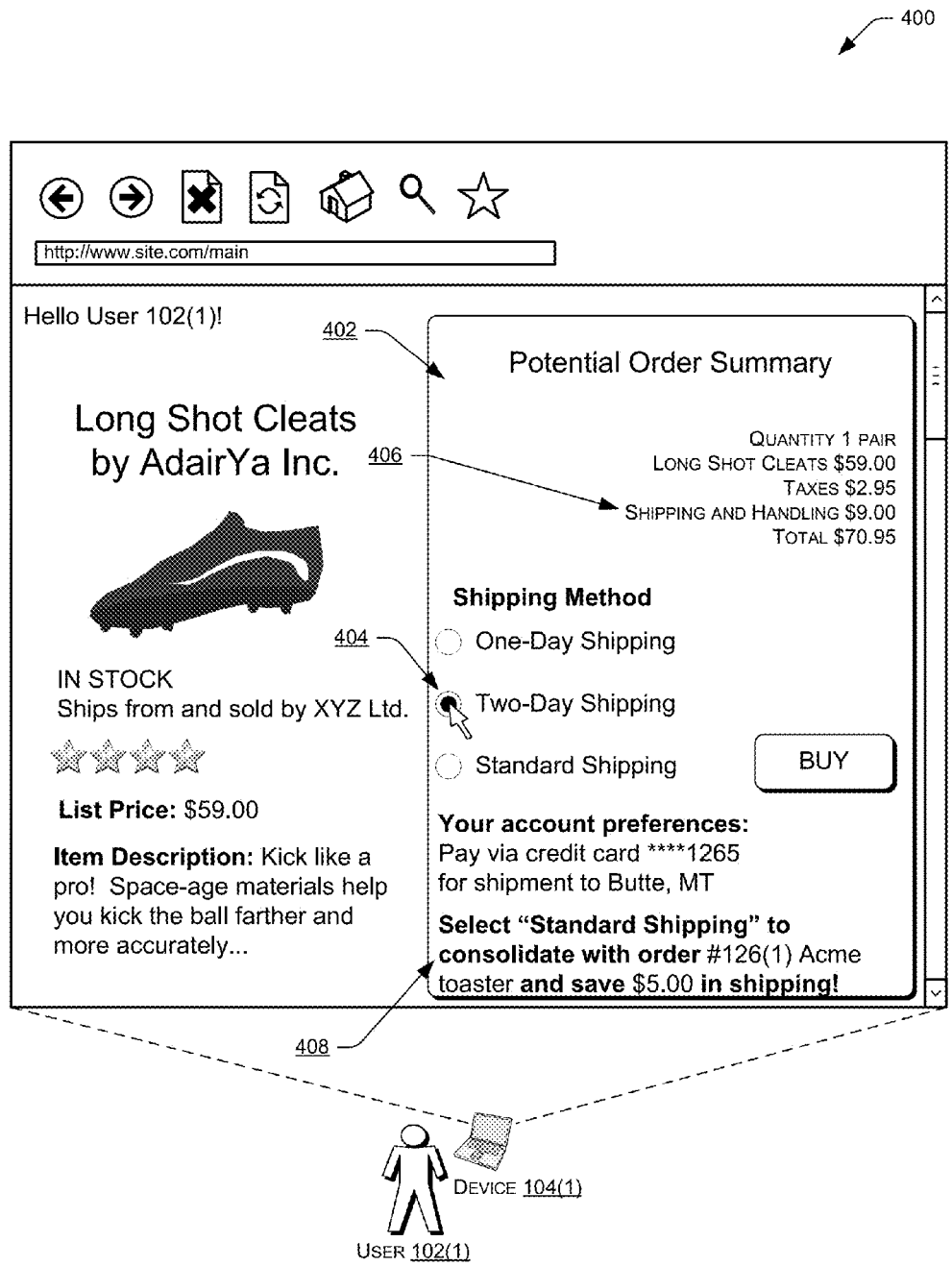
FIG. 4 illustrates yet another example screen rendering of a user interface served to a user device by the transaction processing service of FIG. 1. This example user interface shows that the user has selected a shipping method for the item of FIG. 2 that is incompatible with consolidation with the order of FIG. 1.

FIG. 4 illustrates an example screen rendering of a user interface (UI) 400 served by the transaction processing service 106 of FIG. 1 to device 104(1) after user 102(1) selects a different shipping method for the potential order of cleats 110(1). Here, user 102(1) has now selected to view a potential order summary 402 based on two-day shipping as opposed to standard shipping. As above, user 102(1) has not placed the order at this point. Suppose for this example that cost calculator 130 is configured to allow consolidation when the user, destination, payment method, merchant, origin, and shipment method match between the order 126 and the potential order for selected item 110(1). In contrast to FIG. 3 above, in potential order summary 402 user 102(1) has changed the shipping method to two-day shipping 404 as discussed immediately above. As a result of the difference in shipping method from the existing order 126(1) which uses standard shipping and the potential order for selected item 110(1) using two-day shipping, cost calculator 130 has determined consolidation is not available. Thus, potential order summary 402 does not include a shipping and handling discount cost information presented at 406. As such, the "shipping savings" 306 of FIG. 3 is no longer presented to user 102(1). Instead, potential order summary 402 shows cleats 110(1) being shipped via two-day shipping with a price of $59.00, taxes of $2.95 and shipping and handling of $9.00 (instead of $7.00 due to the increased cost of two-day shipping over standard shipping) for a non-consolidated order total of $70.95.

At 408, the user may be provided with a prompt suggesting that if user 102(1) selects standard shipping, the potential order may be consolidated with open order 126(1). In some instances, prompt 408 may also illustrate an amount that user 102(1) would save by consolidating the cleats with the currently open order comprising the Acme toaster. As described above, should user 102(1) change the shipping method back to standard shipping, the associated cost differential resulting from consolidation may also be presented as shown at 306. As above, consolidation is available while order 126(1) still in "open" status.

In another implementation, user 102(1) may be prompted to modify the open order 126(1) to match the proposed order, thus permitting consolidation. For example, suppose user 102(1) finds it necessary to have the cleats 110(1) quickly, thus requiring two-day shipping. Transaction processing service 106 may present to the user 102(1) (e.g., via UI 400) the option of modifying the shipping method of order 126(1) to two-day shipping, thereby enabling consolidation of the open order and the currently selected cleats.

Figure 5:
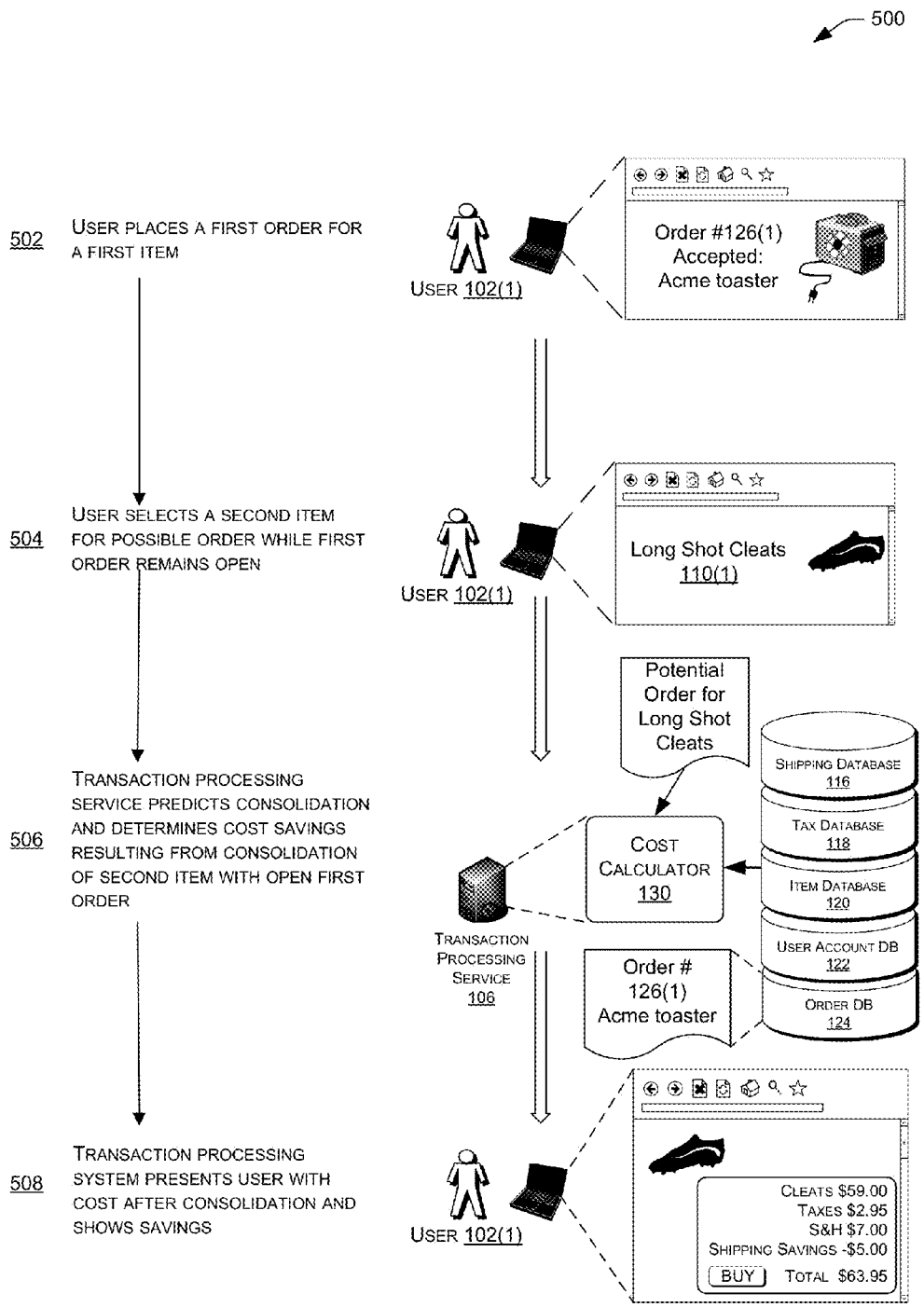
FIG. 5 illustrates an example process that includes the transaction processing service accepting an order from a user, accepting a selection for a second item for a potential order and predicting consolidation and cost differentials resulting from the predicted consolidation.

FIG. 5 illustrates a flow diagram of an example process 500 that includes user 102(1) completing an order with a transaction processing service 106, selecting an item and viewing a cost differential resulting from a predicted consolidation. In this process, user 102(1) has an open order 126(1) within service 106 while selecting another item 110(1) for possible purchase. Note, however, that user 102(1) has not actually placed the order for item 110(1). While FIG. 5 illustrates the described techniques in the context of a client-server, it is again noted that the described techniques may be equally applicable in other contexts.

Process 500 includes operation 502, which represents user 102(1) employing computing device 104 to view the acceptance of order 126(1) for an "Acme toaster." Operation 504 illustrates the user 102(1) selecting a second item for possible order, such as pair of "Long Shot Cleats."

Next, operation 506 shows transaction processing service 106 predicting consolidation of order 126(1) for the Acme toaster and the selected cleats 110(1) into a single order. Cost calculator 130 may access the databases 116-124 to determine what the cost would be for the selected item 110(1) as a separate order. When an open order 126(1) is available, such as order 126(1), cost calculator 130 may validate which existing order or orders may be consolidated with the selected item 110(1). If cost calculator 130 determines that consolidation is available, then this calculator may predict a cost of both the open order and the selected item should user 102(1) consolidate the order and the item. Cost calculator 130 may then calculate a cost differential based on this predicted consolidation as compared to what the total costs would be if service 106 did not consolidate the open order and the currently selected item.

Finally, operation 508 shows transaction processing service 106 presenting a cost after consolidation to user 102(1). Service 106 also shows the savings resulting from the consolidation. For example, the user will save $5.00 in shipping and handling if order 126(1) and selected item 110(1) are consolidated.

While the example given has involved shipping and handling costs, other savings or benefits which accrue to the user may be calculated. For example, in instances where a certain legal jurisdiction taxes shipping, handling or both, consolidation may result in reduced taxes as well as reduced shipping and handling fees. In another example, users may realize a credit from using a particular payment method, such as a specific credit card having a promotional "cash back" offer. Thus, a prediction for consolidation to a single payment method may be made, with the consolidation resulting in a maximum "cash back" incentive to the user. The following section describes several of these example consolidation types that may benefit the user. Of course, while this section describes several examples, multiple other consolidation types are also envisioned.

Illustrative Consolidation Types

As used herein, consolidation involves joining two or more items together in some fashion in order for a user to realize some benefit. As such, the techniques may consolidate item into a same order, may consolidate items with a same merchant, a same payment method or same destination or may consolidate any other aspect of an item order. As described above, consolidation may involve combining an existing order with potential orders to create a consolidated order. For illustration and not by way of limitation, this section describes several other types of consolidation.

Figure 6:
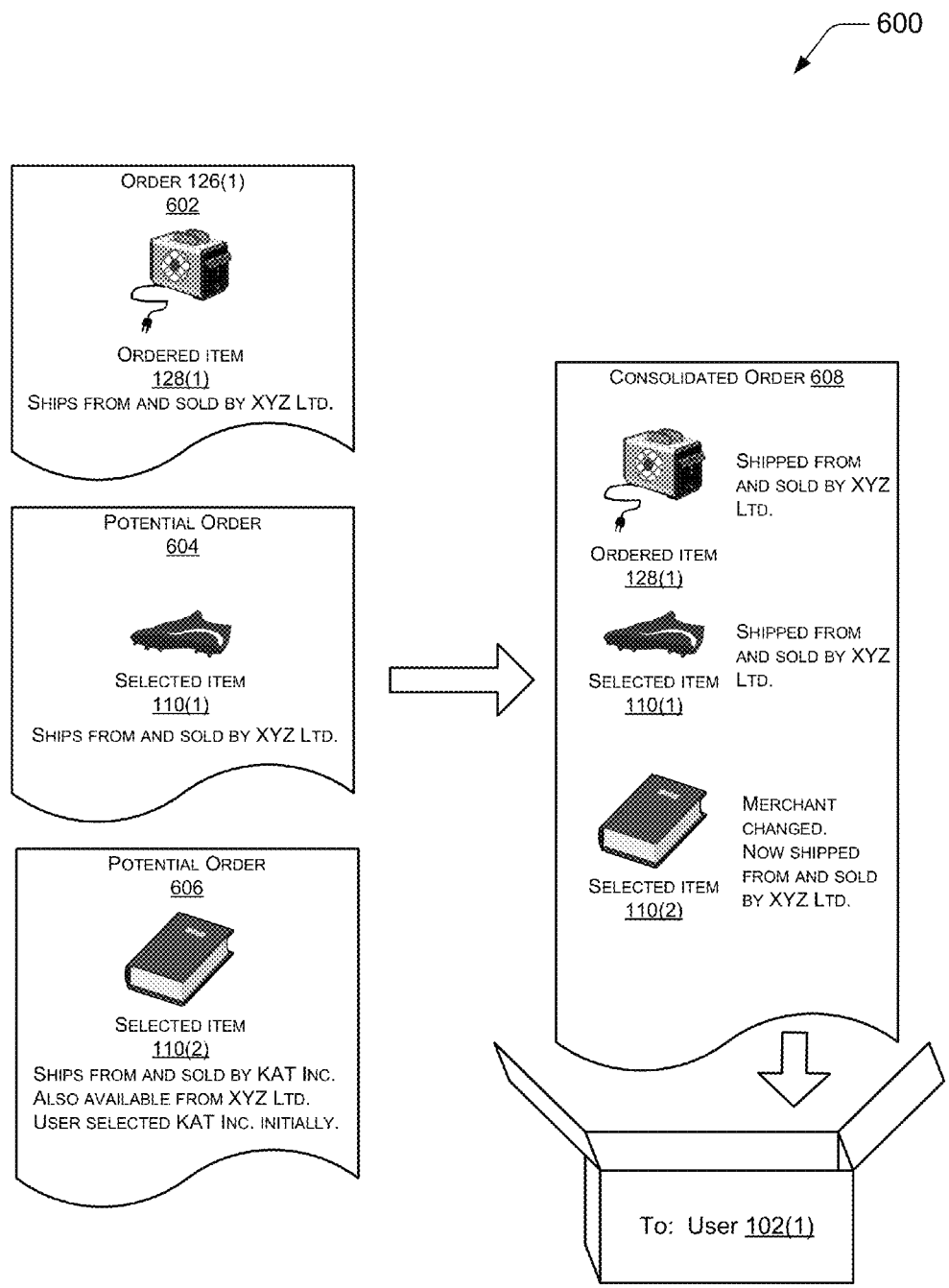
FIG. 6 illustrates a predicted consolidation of an open order and other selected items with a common merchant. In this illustration, the user initially selected items offered by differing merchants before consolidating the selected items with the common merchant.

FIG. 6 illustrates a process 600 for consolidating a potential order and an already placed and open order with a single merchant. Here, a user may have placed an order via service 106 for an item sold by a first merchant. While this order remains open, the user may select another item available for purchase by a second, different merchant. If the first merchant also offers this other item for consumption, then service 106 may offer the user the opportunity to consolidate the selected item with the open order by ordering the other item from first merchant.

Process 600 first illustrates that, at 602, order 126(1) for the "Acme toaster" remains open. As depicted, this completed order is expected to ship from and be sold by the merchant "XYZ Ltd." In this illustration, user 102(1) selects another item 110(1), the "Long Shot Cleats," in the course of shopping. At this point, transaction processing service 106 may treat this selected item as a potential order 604. Should user 102(1) decide to complete this order, the product would be sold by and ship from XYZ Ltd. as well.

User 102(1) continues shopping, and proceeds to select another item 110(2), a book, to create yet another potential order 606. Item 110(2) is available from two merchants: KAT Inc. and XYZ Ltd. Based on factors such as price, shipping and handling, taxes and so forth, user 102(1) may initially choose KAT Inc. to ship and sell item 110(2).

Transaction processing service 106, however, may use cost calculator 130 to predict a consolidation of the order 126(1) and potential orders 604 and 606. Using this prediction, cost calculator 130 may then determine that purchase of item 110(2) from XYZ Ltd. instead of KAT Inc. would result in a lower overall cost to user 102(1) than separate orders. For instance, calculator 130 may determine that user 102(1) would save on shipping and handling costs if each of the potential orders and the open order were consolidated with merchant XYZ Ltd. Thus, service 106 may suggest that user 102(1) choose to purchase item 110(2) from XYZ Ltd. and, therefore, may suggest that selected items 110(1) and 110(2) be consolidated into open order 126(1), as shown at 608.

Figure 7:
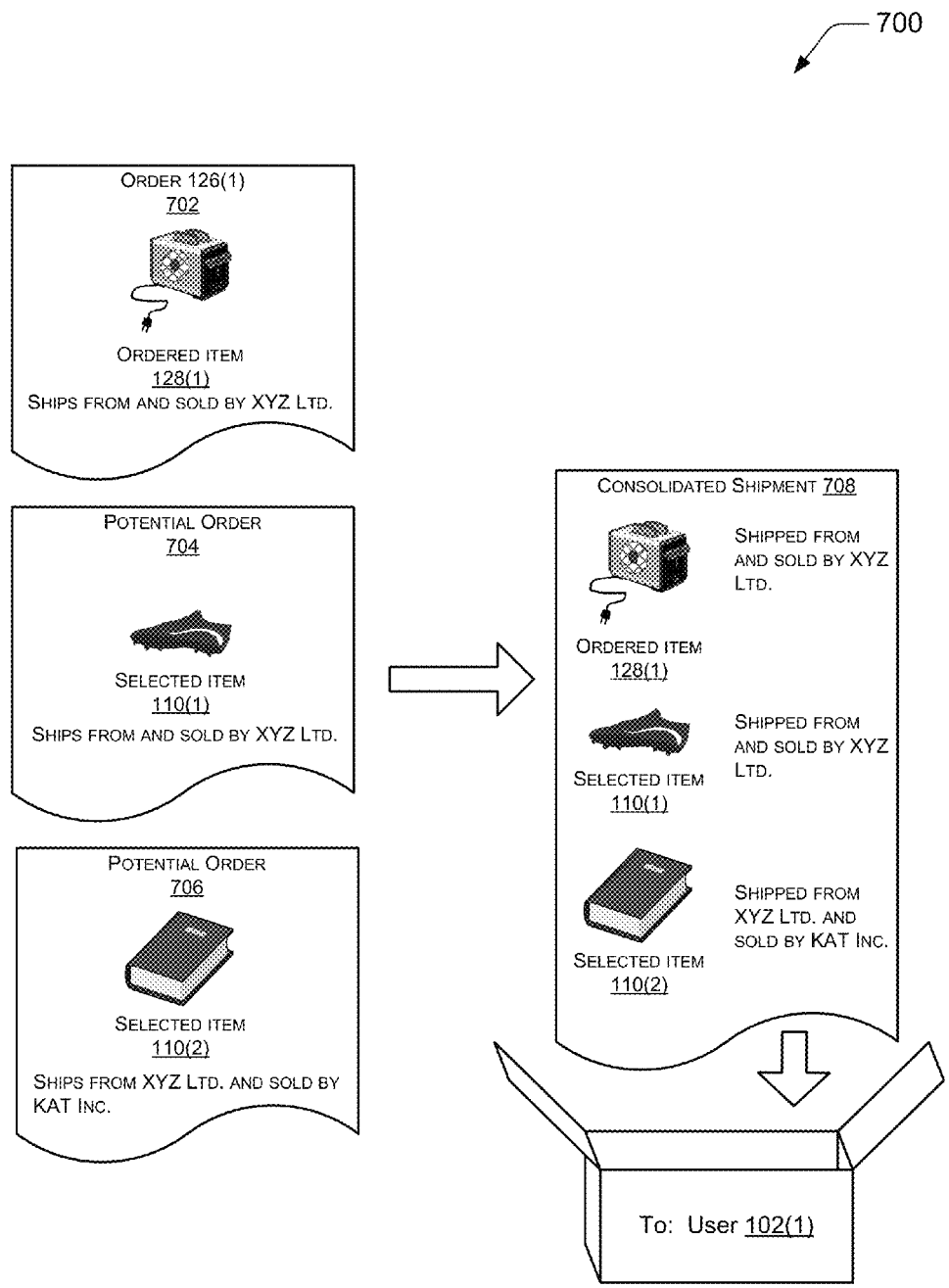
FIG. 7 illustrates a predicted consolidation of an open order and other selected items with a common shipment even though different merchants provide the items.

FIG. 7, meanwhile, illustrates a process 700 for consolidating a potential order and an already placed and open order into a single shipment. In this example, order 126(1) for item 128(1), shown at 702, is scheduled to ship and be sold by XYZ Ltd. A Potential order at 704, meanwhile contains item 110 (1), which may be shipped and sold by XYZ Ltd. Potential order 706 shows a selected item 110(2), which is sold by KAT Inc. but may be shipped from XYZ Ltd. For example, this may occur when KAT Inc. contracts with XYZ Ltd. to fulfill orders for KAT Inc.

In the instant example, the items in order 126(1) and selected items 110(1) and 110(2) are physically located in the same fulfillment facility of XYZ Ltd. As such, transaction processing service 106 may predict a result to user 102(1) if service 106 consolidates these items into a consolidated shipment 708. In some instances, this benefit comprises a cost savings for the consolidation. Consolidation of a shipment may result in each item must appear on a same order, although it need not. In the latter instances, these items are consolidated for the purpose of shipping and, hence, for saving on the cost of shipping the multiple discrete orders. For example, user 102(1) might receive a single box containing Acme toaster 128(1), cleats 110(1), and book 110(2), but may still have two orders. In another implementation, the orders themselves may be combined.

Figure 8:
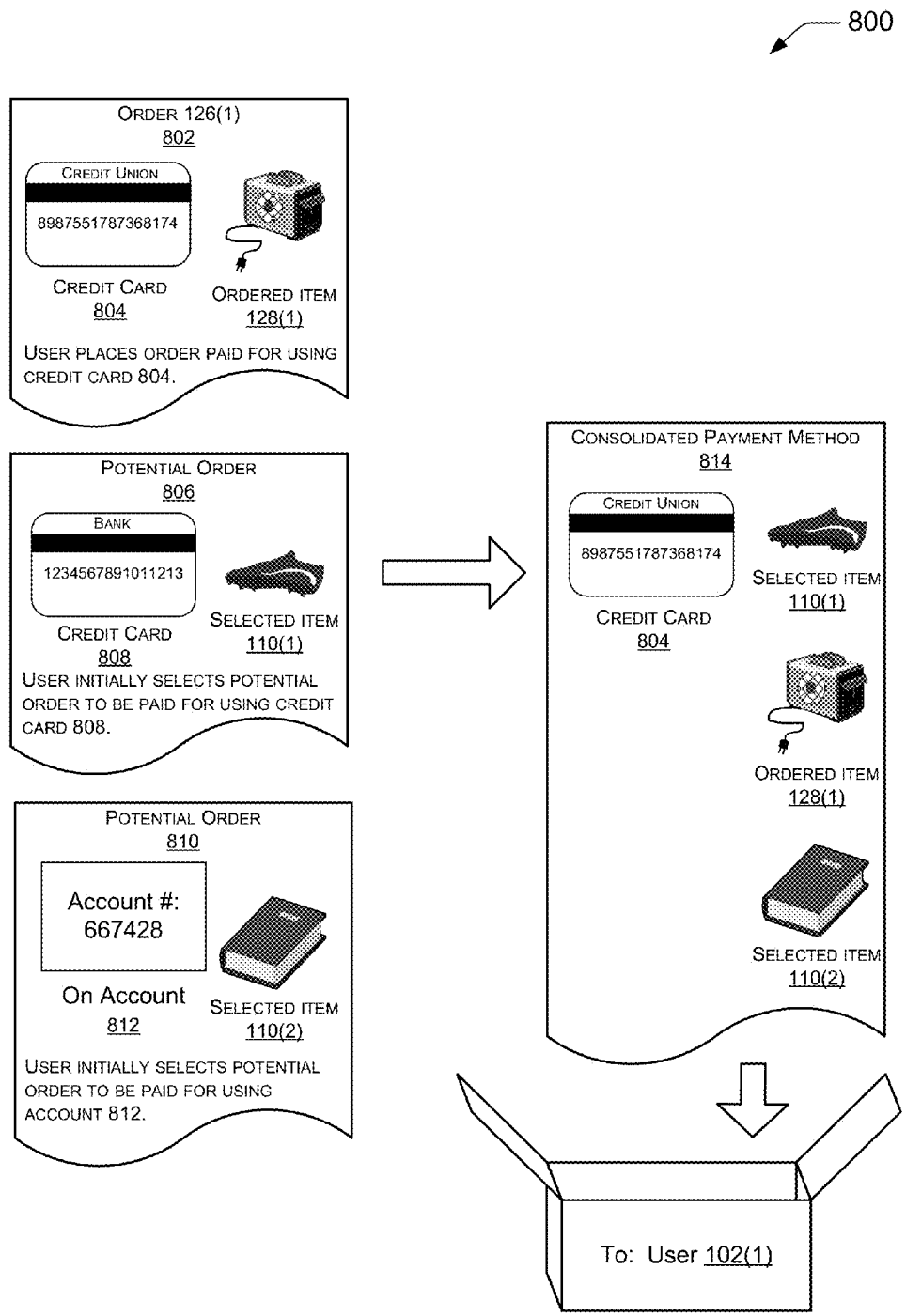
FIG. 8 illustrates a predicted consolidation of an open order and other selected items with a common payment method.

FIG. 8 illustrates a process 800 for consolidating a potential order and an already placed and open order to a payment method. Here, a user may have placed an order via service 106 for an item, and used a payment method of a first credit card. While this order remains open, the user may select another item available for purchase with a second, different credit card. The user may continue to purchase a third item with a third payment method, such as placing the item on an account of the user. Service 106 may offer the user the opportunity to consolidate the selected items with the open order to use a single payment type, such as the first credit card.

Process 800 first illustrates that, at 802, order 126(1) for the "Acme toaster" remains open and shows a payment method of credit card 804 issued by Credit Union. Potential order 806 for cleats 110(1) may have a different payment method, such as credit card 808 issued by Bank. A second potential order 810 for book 110(2) may use the payment method of an account 812. Transaction processing service 106 may predict that consolidation of these items to the same payment method would result in a benefit to the user and/or the merchants. For example, calculator 130 may determine that Credit Union credit card 804 provides a greater "cash back" incentive to user 102(1), incurs lower fees than Bank credit card 808 to user 102(1), allows a payment term discount over account 812 which is favorable to user 102(1), has lower transactional fees to the merchant, etc. Thus, the transaction processing service 106 may suggest consolidation of these items to a single payment method, such as credit card 804 as shown at 814 in this example. Consolidation of payment type does not necessarily mean that all items must appear on the same order (although they may), but rather than they are consolidated for the purpose of applying payment.

Figure 9:
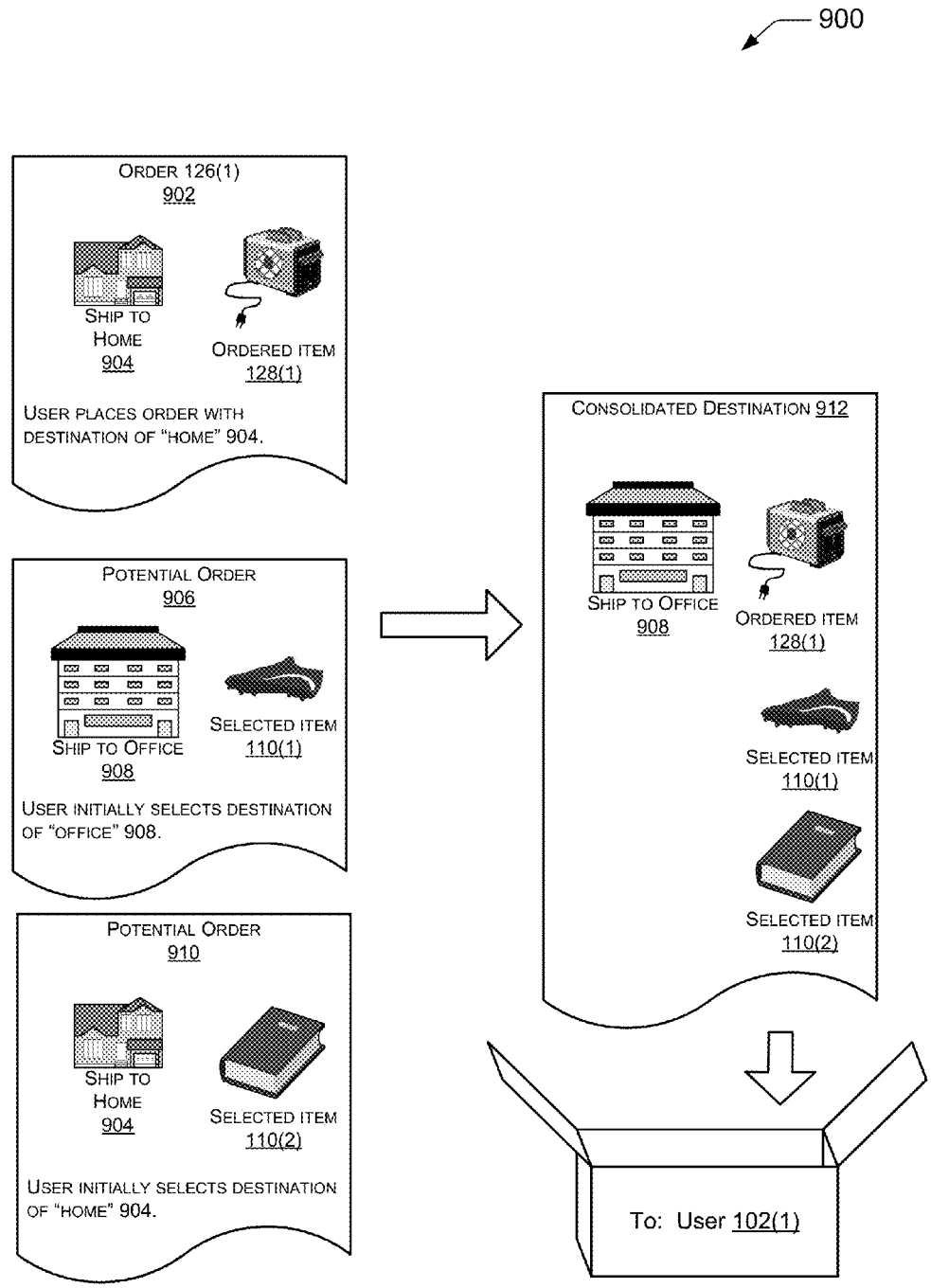
FIG. 9 illustrates a predicted consolidation of an open order and other selected items with a common destination.

Finally, FIG. 9 illustrates a process 900 for consolidating a potential order and an already placed and open order by destination. Here, a user may have placed an order via service 106 for an item for delivery to a first destination address. While this order remains open, the user may select another item for delivery to a second destination address. The user may then select a third item for delivery, this item slated for delivery to the first destination address. Service 106 may offer the user the opportunity to consolidate the selected items for delivery to a common, consolidated destination such as the second destination address.

Process 900 first illustrates that, at 902, order 126(1) for the "Acme toaster" remains open with a shipping destination address of home 904. User 102(1) selects another item 110 (1), the "Long Shot Cleats," in the course of shopping. At this point, transaction processing service 106 may treat this selected item as a potential order 604. Potential order 906 for cleats 110(1) is shown with a shipping destination address of office 908. User 102(1) continues shopping and selects a book 110(2), which results in another potential order 910, this potential order having a shipping destination address of home 904 as well as that of the Acme toaster.

Transaction processing service 106 may predict consolidation of these items to a single particular destination may result in a benefit to the user and/or the merchants. For example, it may be determined that shipping costs to commercial addresses such as office 908 are lower than shipping costs to residential addresses such as home 904. Thus, the transaction processing service 106 may suggest consolidation of these items to the single destination 912 of the office 908. As illustrated in this example, the "Acme toaster" 128(1), cleats 110(1), and book 110(2) are delivered to the office 908. Consolidating by destination does not necessarily mean that all items must appear on the same order, or in the same package, but rather than they are consolidated on the basis of their destination.

Illustrative Processes

Figure 10:
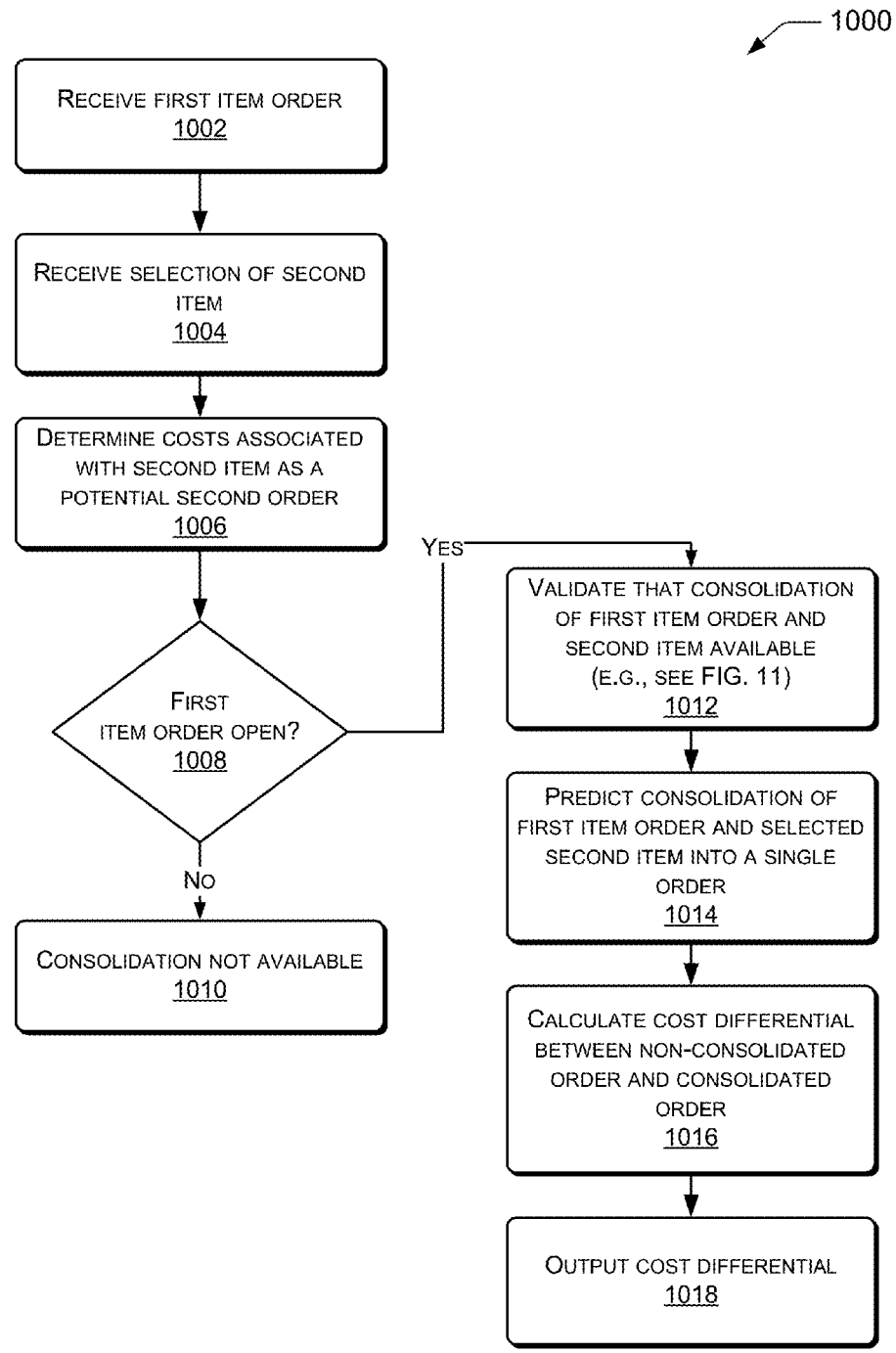
FIG. 10 is a flow diagram of an example process of order consolidation prediction that may be implemented by the architecture of FIG. 1 and/or by other architectures.

FIG. 10 shows an illustrative process 1000 of predicting order consolidation that may, but need not, be implemented using the architecture shown in FIG. 1. The process 1000 (as well as process 1100 in FIG. 11) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process will be described in the context of the architecture of FIG. 1, but may be implemented by other architectures.

Block 1002 receives a first item order from a user via a device for a first item. This order is complete, and without further action would ship or otherwise be available to the user in due course. Block 1004 receives a selection of a second item from the user via the device at a time when the first order remains open. While selected, this second item is not yet a completed order.

Block 1006 determines costs associated with the second item as a potential second order. For example, price, shipping, handling and tax costs are calculated for the selected second item as if it were to be completed as separate order. Block 1008 determines when the first item order is open. Orders may be considered open as determined by the needs of the transactional processing service and/or the business rules within which it operates. In some implementations, an order may be considered open so long as items may be added to it, while in others an order remains open until picked (that is, the items have been retrieved from a warehouse shelf and prepared for shipment), open until shipped, open until delivered and so forth.

When block 1008 determines the first item order is not open, block 1010 may report to the transactional processing service that consolidation is not available. Otherwise, block 1012 may validate that consolidation of the open first item order and second item is available. This validation may include matching user, destination address, payment method, merchant, origin, ship method, and so forth. Validation is discussed in more detail below with regards to FIG. 11.

Block 1014 predicts consolidation of the first item order and the selected second item into a single order. While described in the context of consolidating orders, as described above with respect to FIGS. 6-9, consolidation may take place with regards to payment type, destination, merchant and so forth. Multiple consolidations are also possible in some implementations, such as consolidating the first item order and selected second item to a single order from a single merchant having a single shipment.

Block 1016 calculates a cost differential between the non-consolidated potential second order and the predicted consolidated first item order and second item. For example, returning to FIG. 1, the cost differential resulting from combining order 126(1) and selected item 110(1) into a single order is a $5.00 savings in shipping and handling. The cost differential calculated may include taxes, fees, shipping, handling, discounts, refunds, available special incentives and so forth. Block 1018 may then present the cost differential to a user, such as depicted in FIG. 3.

Figure 11:
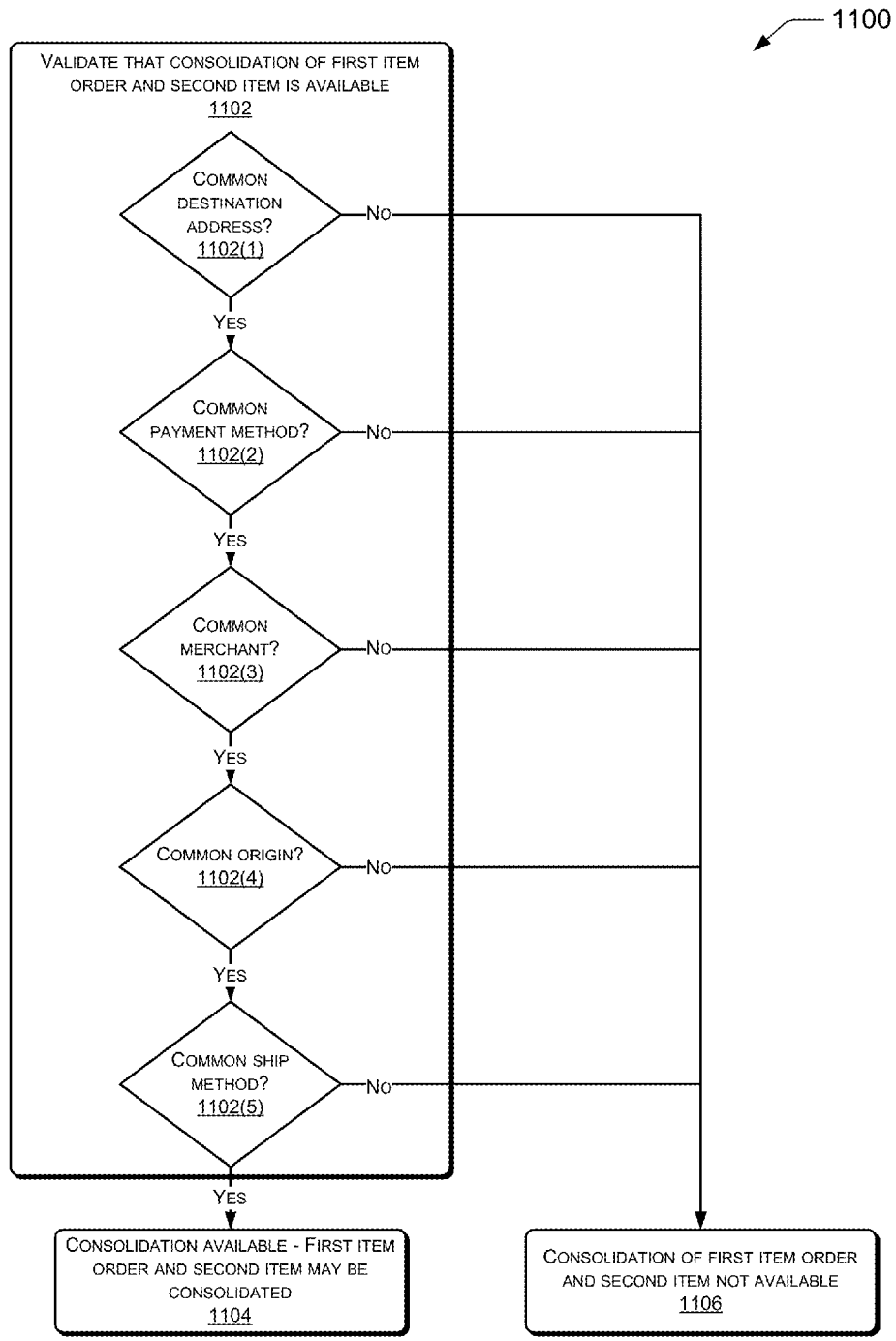
FIG. 11 is a flow diagram of an example process of validating when consolidation is available that may be implemented by the architecture of FIG. 1 and/or by other architectures.

FIG. 11 is a flow diagram of an example process 1100 of validating whether or not consolidation of an open order and a selected item is available. The architecture of FIG. 1 and/or other architectures may implement process 1100.

Block 1102 compares attributes or parameters of the first item order with those of the second item. When the comparison permits consolidation of the first item and second item, block 1104 allows consolidation of the first item order and second item. Otherwise, when the comparison of block 1102 fails, block 1106 denies consolidation.

Returning to block 1102, the comparison may vary according to the requirements of the transaction processing service 106. In one implementation as illustrated here, block 1102 may compare five factors before permitting consolidation. These factors may include a common destination address 1102(1), a common payment method 1102(2), a common merchant 1102(3), a common origin 1102(4) and a common ship method 1102(5).

As depicted in this figure, all five of these factors may be determined to match before some implementations allow for consolidation. In other implementations, various combinations of the above comparison may be used. For example, validation may allow consolidation of orders which only share a common destination address 1102(1), or common payment method 1102(2), and so forth.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A computer-implemented method comprising:
under control of one or more computer systems configured with executable instructions,
receiving a first order for one or more first items, wherein the first order is associated with an account and has one or more first order attributes;
after receiving the first order and before the first order is completed, receiving a phrase token and a selection of one or more second items for a second potential order that has one or more second order attributes;
associating the phrase token with the account;
determining that consolidation of the first order and the second potential order is available because the first order is not completed;
determining that at least one first order attribute is different than at least one second order attribute and that consolidation of the first order and the second potential order is available if the at least one first order attribute or the at least one second order attribute is modified so that the at least one first order attribute and the at least one second order attribute match;
receiving an indication to modify the at least one first order attribute or the at least one second order attribute so the at least one first order attribute or the at least one second order attribute match; and predicting a consolidated cost associated with fulfillment of the first order and the second potential order when the first order and the second potential order are consolidated.

2. The method of claim 1, wherein the first order is in an open state after the first order is received and before the first order is completed, and wherein one or more first order attributes are modifiable when the first order is in the open state.

3. The method of claim 1, wherein the first order is completed after the first order is shipped.

4. The method of claim 1, wherein the first order is completed after the first order is received at a delivery destination.

5. The method of claim 1, wherein the at least one first order attribute and the at least one second order attribute comprise a shipping type.

6. The method of claim 1, wherein the at least one first order attribute and the at least one second order attribute comprise a merchant that sells the one or more first items or the one or more second items.

7. The method of claim 1, wherein the at least one first order attribute and the at least one second order attribute comprise a delivery destination.

8. The method of claim 1, wherein the indication is based in part on a user selection.

9. One or more non-transitory computer-readable storage media storing computer-executable instructions that, when executed, cause one or more processors to perform acts comprising:
   receiving, as part of a potential order, a selection of one or more items from a user, wherein the potential order includes one or more potential order attributes;
   determining that a previous order is available for consolidation, wherein the previous order is an open order that includes one or more previous items selected by the user and one or more previous order attributes;
   determining that at least one potential order attribute is different than at least one previous order attribute and that consolidation of the potential order and the previous order into a single order is available if the at least one potential order attribute or the at least one previous order attribute is modified;
   calculating a cost differential between processing the single order and processing separate orders that includes non-consolidation of the previous order and the potential order; and
   modifying, based on the cost differential indicating that processing the single order is less expensive than processing the separate orders, the at least one potential order attribute or the at least one previous order attribute so that the single order can be processed.

10. The one or more non-transitory computer-readable storage media of claim 9, further comprising receiving a token phrase associated with the potential order, wherein the token phrase identifies an account that indicates the previous order is available for consolidation.

11. The one or more non-transitory computer-readable storage media of claim 9, wherein the cost differential is based in part on a differential in shipping cost.

12. The one or more non-transitory computer-readable storage media of claim 9, wherein the cost differential is based in part on a differential in handling cost.

13. The one or more non-transitory computer-readable storage media of claim 9, wherein the cost differential is based in part on a differential in tax cost.

14. The one or more non-transitory computer-readable storage media of claim 9, wherein the at least one potential order attribute and the at least one previous order attribute comprise a shipping option.

15. The one or more non-transitory computer-readable storage media of claim 9, wherein the at least one potential order attribute and the at least one previous order attribute comprise a payment type option.

16. The one or more non-transitory computer-readable storage media of claim 9, wherein the at least one potential order attribute and the at least one previous order attribute comprise a destination address option.

17. The one or more non-transitory computer-readable storage media of claim 9, wherein the at least one potential order attribute and the at least one previous order attribute comprise a merchant option.

18. A system comprising:
   one or more processors;
   one or more memories;
   a first module, stored in the one or more memories and executable on the one or more processors, that determines if consolidation of a current order and a previously placed order is available, wherein consolidation is available before the previously placed order is completed;
   a second module, stored in the one or more memories and executable on the one or more processors, that determines that an attribute of the current order does not match a corresponding attribute of the previously placed order and that modifies the attribute of the current order or the corresponding attribute of the previously placed order so the attribute of the current order and the corresponding attribute of the previously placed order match or are of a same type; and
   a third module, stored in the one or memories and executable on the one or more processors, that predicts a cost savings resulting from consolidating the current order and the previously placed order, and that serves the cost savings for presentation to the user.

19. The system of claim 18, wherein the third module predicts the cost savings by:
   calculating a cost for the current order;
   calculating a cost for the previously placed order;
   calculating a cost of a consolidated order comprising the current order and the previously placed order; and
   determining a difference between: (i) the cost for the current order and the cost for the previously placed order, and (ii) the cost of the consolidated order comprising the current order and the previously placed order.

20. The system of claim 18, wherein the first module further receives a token phrase associated with the current order and the first module uses the token phrase to identify an account that indicates that the previously placed order is available for consolidation.

21. A method comprising:
   receiving a first order placed by a user, the first order including one or more first order attributes;
   after receiving the first order and while the first order is open and not yet completed, receiving a selection of one or more items that are part of a second potential order that includes one or more second order attributes;
   determining, at one or more servers, that at least one first order attribute is different than at least one second order attribute and that consolidation of the first order and the second potential order is available if the at least one first order attribute or the at least one second order attribute is modified so that the at least one first order attribute and the at least one second order attribute match;

providing, to a user device associated with the user, an indication;

to modify the at least one first order attribute or the at least one second order attribute so that the at least one first order attribute and the at least one second order attribute match;

receiving an instruction to modify the at least one first order attribute or the at least one second order attribute so that the at least one first order attribute and the at least one second order attribute match; and in response to receiving the instruction, placing a consolidated order that includes items of the first order and the one or more items that are part of the second potential order.

22. The method of claim 21, wherein the first order is completed after the first order is shipped.

23. The method of claim 21, wherein the first order is completed after the first order is received at a delivery destination.

24. The method of claim 21, wherein the at least one first order attribute and the at least one second order attribute comprise a shipping type.

25. The method of claim 21, wherein the at least one first order attribute and the at least one second order attribute comprise a merchant that is selling the items of the first order or the one or more items of the second potential order.

26. The method of claim 21, wherein the at least one first order attribute and the at least one second order attribute comprise a delivery destination.

27. The method of claim 21, further comprising associating the first order and the second potential order with an account using a phrase token.

* * * * *